Dec. 5, 1939.    G. W. GRISDALE    2,182,123
RECORDER MECHANISM
Filed July 17, 1937    2 Sheets-Sheet 2
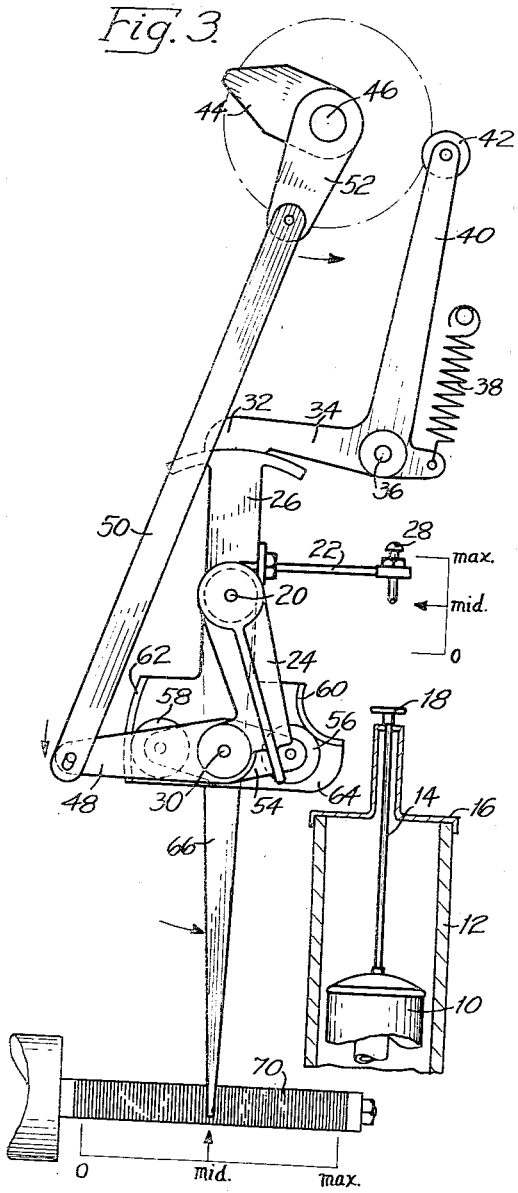
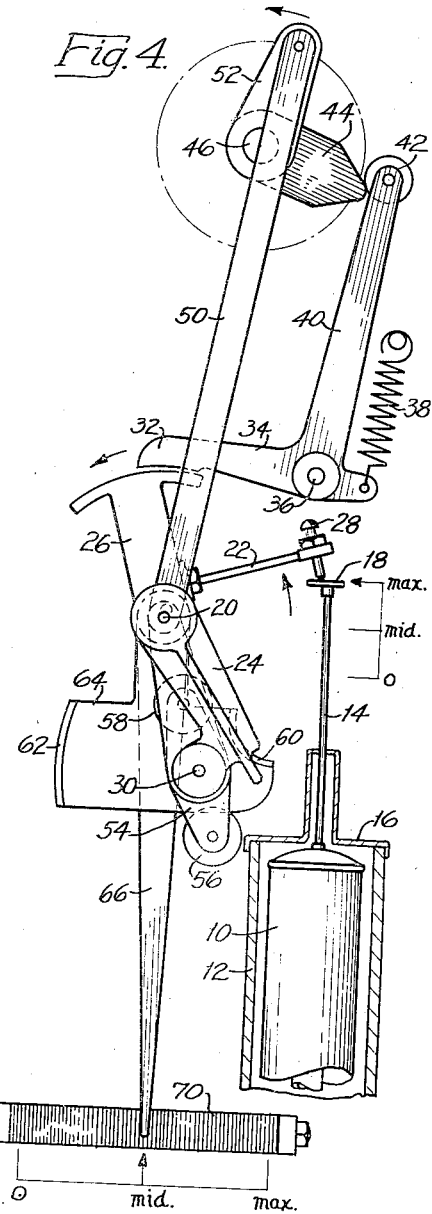
Inventor
George W. Grisdale.
by McConkey Dawson & Booth
Attorneys Patented Dec. 5, 1939

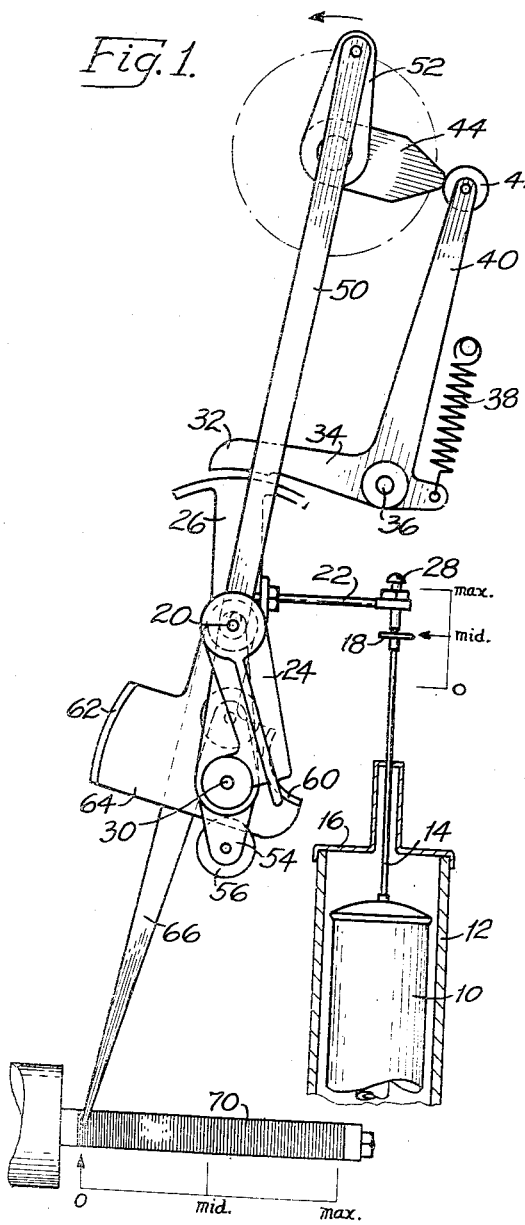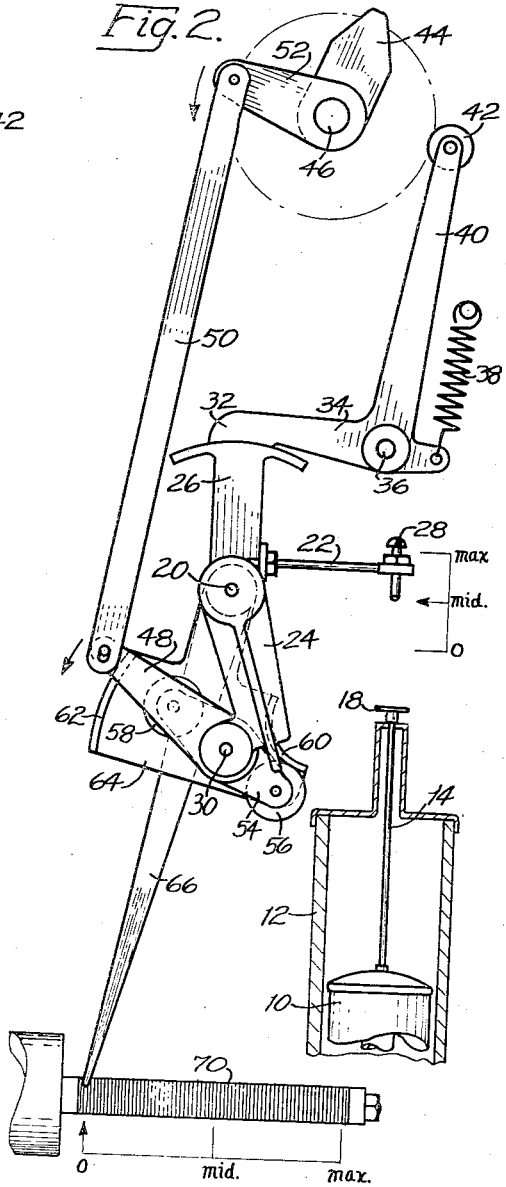

2,182,123

UNITED STATES PATENT OFFICE 2,182,123

RECORDER MECHANISM

George W. Grisdale, Chicago, Ill., assignor to Republic Flow Meters Company, Chicago, Ill., a corporation of Illinois Application July 17, 1937, Serial No. 154,134

6 Claims. (Cl. 74—1)

This invention relates to recorders and the like, and is illustrated as embodied in mechanism for controlling the integrator of a $CO_2$ recorder.

An object of the invention is to combine a very sensitive determination of the setting of the mechanism with a powerful and forcible operation of the corresponding adjustment, this being in the illustrated case the adjustment of a variable resistance in the integrator circuit. In one desirable arrangement a device whose position is controlled very sensitively by the float of the measuring apparatus, or its equivalent, is clamped firmly in adjusted position and used as the reaction element of a power-operated cam linkage which has ample power to make the desired adjustment.

Another object of the invention is to provide simple and reliable power-driven mechanism sensitively controlled by a float or the like.

The above and other objects and features of the invention, including various novel combinations and desirable constructions, will be apparent from the following description of the illustrative embodiment shown in the accompanying drawings, in which:

Figures 1, 2, 3 and 4 are elevational views, partly in section, of the float-controlled adjusting mechanism, the different views showing it at different stages in making an adjustment.

In these figures, 10 is the float and 12 is the float chamber of an apparatus for analyzing the percentage of $CO_2$ in flue gases. The apparatus may be constructed as fully described in application No. 62,420, filed February 5, 1936, by myself jointly with Albert F. Spitzglass.

As explained in that application, after each determination of the $CO_2$ in a sample of flue gases, the float 10 drops to the position of Figures 2 and 3, and during the analysis of the succeeding sample it rises to some other position, as for example in Figure 1 or Figure 4, corresponding to the percentage of $CO_2$ in the sample being analyzed. Thus the float 10 periodically rises to a position which varies with the $CO_2$ determination.

The float 10 is shown with a support rod 14 extending upwardly therefrom through a guide opening in a cap 16 for the float chamber 12, and carrying a head 18 which serves as a stop for the adjusting mechanism.

Pivoted freely on a fixed pivot 20 is a device adapted to be set by engagement with the stop 18 when in its upper position, and which includes three rigidly connected parts 22, 24, and 26.

Part 22 is an arm having adjustably threaded through its end a setscrew 28 engageable with the stop 18. Part 24 is a depending arm carrying a fulcrum pivot 30, the position of which is shifted by adjustment of the device periodically to correspond to the level at which setscrew 28 engages stop 18. Part 26 is a brake or clamp element, normally engaged by a brake or clamp shoe 32, and held thereby in adjusted position.

The shoe 32 is illustrated as integrally formed at one end of an arm 34 of a three-arm lever pivoted on a shaft or pivot 36. Another arm of the lever has a coil spring 38 connected thereto and acting in a direction to hold the shoe against the clamp member 26. The third arm 40 of the lever carries a cam roller 42, periodically engaged by a cam 44 on a drive shaft 46, and operated thereby to lift the shoe 32 from the brake member 26 against the resistance of the spring 38. The shaft 46 is driven synchronously with the analyzing apparatus which controls movements of the float 10 so that the float will always be raised when the cam 44 engages the roller 42.

The fulcrum pivot 30 has pivoted thereon an arm 48, connected to and oscillated by a link 50 pivoted at its upper end to a crank arm 52 on the power-driven shaft 46. The arm 48 is rigid with a double lever 54 carrying rollers 56 and 58 equally spaced from shaft 30. Thus rotation of shaft 46 causes continuous oscillation of the double lever 54, the exact path of the rollers 56 and 58 depending on the position of the pivot 30 and therefore on the height reached by stop 18 in analyzing the last preceding sample.

Rollers 56 and 58 on each oscillation engage respectively cam flanges 60 and 62 formed on a cam device 64 rigid with an arm 66 shown mounted coaxially with respect to the fixed pivot 20. Cam flanges 60 and 62 are designed so that the rollers engage them wedgingly, and shift the arm 66 gradually. At the end of the downward stroke of arm 48, the flanges 60 and 62 and the rollers 56 and 58 are always in the same relative positions. Arm 66 is preferably the movable part of an adjustable resistance, and is shown as engaging yieldingly at its lower end a resistance wire winding 70.

The adjustable resistance is intended to be connected in an integrator circuit, as for example in the circuit of the integrator described in Patent No. 2,076,100, granted Republic Flow Meters Company on April 6, 1937, on application of Albert F. Spitzglass.

Arm 66 is sprung against the resistance device 70, so that it is yieldingly held in any position to which it is moved, and requires substantial force to shift it.

In operation, assume the arm 66 to have been set at zero on the resistance 70 as shown in Figure 1 and the sample being measured to be such as to raise the float 10 to the middle position also as shown in Figure 1. As the cam 44 engages roller 42 it will tilt lever 40 to raise the shoe 32 from the brake member 26, permitting the device 22—24—26 to swing down until the setscrew 28 engages the stop 18. Since this device is almost balanced the setscrew will exert only a very light pressure on the stop and a very sensitive setting will be obtained.

At this time the rollers 56 and 58 have been shifted to idle positions away from the cam flanges 60 and 62 by the link 50.

As the shaft 46 turns to the position of Figure 2 the shoe 32 first engages the brake member 26 and then the analyzer is operated to let the float 10 drop to be in position to measure the next charge. The link 50 has moved down to tilt arm 48 and to move the roller 56 into engagement with the flange 60.

Upon further turning of the shaft 46 to the position of Figure 3 the rollers 56 and 58 have moved to their adjusting position and the roller 56 has cammed the flange 60 to the right to move the arm 66 to a position on the resistance 70 corresponding to the setting of the device 22—24—26. It will be noted that both arm 66 and setscrew 28 occupy the same relative positions, i. e., midscale position, and that the resistance has been adjusted to correspond to the position of the float 10 in Figure 1.

Figure 4 illustrates the beginning of a new cycle with cam 44 engaging roller 42 to release the shoe 32 and with device 22—24—26 being reset by the float 10. As this cycle is completed the roller 56 will again engage flange 60 to shift the arm 66 to a new position according to the new setting. In this way the arm 66 is periodically reset to correspond to the values of successive samples as measured by the float 10.

While one illustrative embodiment has been described in detail, it is not my intention to limit the scope of the invention to that particular embodiment or otherwise than by the terms of the appended claims.

I claim:

1. Control mechanism for a recorder or the like comprising a member set periodically according to a quantity to be recorded, an angularly movable arm, a cam device connected to said arm, and a power-operated shifting mechanism including a device periodically freed and re-set by engagement with said member, power-operated means for gripping and holding said device when so re-set, and power-operated means mounted on said device and shifted therewith to various positions and engaging said cam device and operating it forcibly to shift said arm to correspond to the position of said member.

2. Control mechanism for a recorder or the like comprising a member set according to a quantity to be recorded, an angularly movable arm, a cam device connected to said arm, and a power-operated shifting mechanism including a device periodically re-set by engagement with said member, means for gripping and holding said device when so re-set, and power-operated means mounted on said device and shifted therewith to various positions and engaging said cam device and operating it forcibly to shift said arm to correspond to the position of said member.

3. A control mechanism for a recorder or the like comprising an angularly movable arm, a cam device connected to said arm, a support having its position periodically re-set in accordance with a quantity to be recorded, means for holding said support in any position in which it is so re-set, and power-operated means mounted on said support and engaging said cam device and operative through the cam device to shift said arm to a position corresponding to the position of said support.

4. A control mechanism for a recorder or the like comprising an arm movable to different positions corresponding to different values of a quantity to be recorded, a cam device connected to said arm, a support having its position periodically re-set in accordance with said quantity to be recorded, means for holding said support in any position in which it is so re-set, and power-operated means mounted on said support and shifted therewith and engaging said cam device and operative through the cam device to shift said arm to a position corresponding to the position of said support.

5. Control mechanism for a recorder or the like comprising an angularly movable arm, a cam device connected to said arm, a support having its position periodically reset in accordance with a quantity to be recorded, means for holding the support in any position in which it is so reset, a lever pivoted on said support and including a portion engageable with said cam device and means periodically to rock said lever whereby said portion will move the arm through the cam device to a position corresponding to that of the support.

6. Control mechanism for a recorder or the like comprising an angularly movable arm, a cam device connected to said arm including spaced apart cam surfaces, a support having its position periodically reset in accordance with a quantity to be recorded, means for holding the support in any position in which it is so reset, a lever pivoted on said support and including spaced portions engageable with said cam surfaces, and means periodically to rock said lever whereby said portions will move the arm through the cam surfaces to a position corresponding to that of the support.

GEORGE W. GRISDALE.